US008472992B1

(12) United States Patent
Vargantwar

(10) Patent No.: US 8,472,992 B1
(45) Date of Patent: *Jun. 25, 2013

(54) POWER CONTROL SETPOINT BASED ON VIRTUAL TERMINATION TARGET

(75) Inventor: Sachin R. Vargantwar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 415 days.

This patent is subject to a terminal disclaimer.

(21) Appl. No.: 12/781,898

(22) Filed: May 18, 2010

(51) Int. Cl.
*H04B 1/00* (2006.01)
*H04B 17/00* (2006.01)
*H04B 7/00* (2006.01)

(52) U.S. Cl.
USPC .......... 455/522; 455/69; 455/67.11; 455/63.1

(58) Field of Classification Search
USPC ............................................. 455/522, 69, 68
See application file for complete search history.

(56) References Cited

U.S. PATENT DOCUMENTS

| | | | |
|---|---|---|---|
| 5,412,341 A | 5/1995 | Walczak | |
| 5,502,723 A | 3/1996 | Sanders | |
| 6,320,852 B1 * | 11/2001 | Obuchi et al. | 370/328 |
| 6,697,343 B1 * | 2/2004 | Kamel et al. | 370/311 |
| 6,754,191 B1 | 6/2004 | Paranchych et al. | |
| 7,215,652 B1 * | 5/2007 | Foley et al. | 370/319 |
| 2002/0001287 A1 | 1/2002 | Bergenwall et al. | |
| 2003/0040274 A1 | 2/2003 | Dai et al. | |
| 2004/0170192 A1 | 9/2004 | Herrmann | |
| 2005/0143012 A1 * | 6/2005 | Gu et al. | 455/67.13 |
| 2005/0152302 A1 | 7/2005 | Takahashi et al. | |
| 2006/0141935 A1 * | 6/2006 | Hou et al. | 455/63.1 |
| 2007/0168577 A1 * | 7/2007 | Kim et al. | 710/15 |
| 2008/0080424 A1 | 4/2008 | Torsner et al. | |
| 2008/0108366 A1 | 5/2008 | Hu | |
| 2008/0220791 A1 * | 9/2008 | Cho et al. | 455/450 |
| 2008/0267134 A1 | 10/2008 | Cheng et al. | |
| 2008/0282133 A1 | 11/2008 | Lo et al. | |
| 2008/0320527 A1 * | 12/2008 | Bachu et al. | 725/62 |
| 2009/0082054 A1 | 3/2009 | Li et al. | |
| 2009/0197601 A1 * | 8/2009 | Kim et al. | 455/434 |
| 2010/0061496 A1 * | 3/2010 | Black et al. | 375/346 |
| 2010/0091693 A1 | 4/2010 | Pelletier et al. | |
| 2010/0142479 A1 * | 6/2010 | Black et al. | 370/331 |
| 2010/0220673 A1 | 9/2010 | Hui et al. | |

(Continued)

OTHER PUBLICATIONS

Unpublished U.S. Appl. No. 12/815,100, entitled "Enhanced Virtual Termination Target Mechanism" filed Jun. 14, 2010 in the name of Sachin R. Vargantwar.

(Continued)

*Primary Examiner* — Tilahun B Gesesse

(57) ABSTRACT

A method and system is disclosed for dynamic setpoint adjustment during extended frame decoding. In accordance with an example embodiment, upon determining that a frame transmission from an access terminal has not been successfully decoded during a nominal frame period, a base station will implement a gradual increase of the setpoint in small steps over the course of an extended decoding interval. Beginning at the nominal termination target of an nominal frame period that failed to yield a successfully decoded frame, the setpoint is increased in a series of intermediate setpoint steps during a corresponding series of successive, intermediate decoding intervals which add up to the total duration of the extended decoding interval. Decoding during intermediate decoding intervals continues until either the virtual termination target is reached or successful decoding, whichever occurs first.

21 Claims, 7 Drawing Sheets

U.S. PATENT DOCUMENTS

| | | |
|---|---|---|
| 2011/0019705 A1 | 1/2011 | Adams et al. |
| 2011/0143805 A1 | 6/2011 | Ramasamy et al. |
| 2011/0212731 A1 | 9/2011 | Lee et al. |

OTHER PUBLICATIONS

Unpublished U.S. Appl. No. 12/817,853, entitled Dynamic Virtual Termination Target Based on RF Conditions filed Jun. 17, 2010 in the name of Sachin R. Vargantwar.

Unpublished U.S. Appl. No. 12/943,424, entitled "Adaptive Virtual Termination Target" filed Nov. 10, 2010 in the name of Sachin R. Vargantwar.

Office Action in U.S. Appl. No. 12/943,424 mailed Nov. 14, 2012.

Black et al., "Interference Cancellation Techniques for CDMA2000 lx Reverse Link", IEEE Globecom 2009 proceedings 2009.

Office Action in U.S. Appl. No. 12/817,853 mailed Jan. 17, 2013.

Komine, A sturdy on optimal target of synchronous H-ARQ for next generation cellular system, Jul. 2008.

Office Action in U.S. Appl. No. 12/815,100 mailed May 10, 2012.

Notice of Allowance in U.S. Appl. No. 12/815,100 mailed Aug. 16, 2012.

* cited by examiner

POWER CONTROL SETPOINT BASED ON VIRTUAL TERMINATION TARGET

BACKGROUND

In a typical cellular radio communication system (wireless communication system), an area is divided geographically into a number of cell sites, each defined by a radio frequency (RF) radiation pattern from a respective base transceiver station (BTS) antenna. The base station antennas in the cells are in turn coupled to a base station controller (BSC), which is then coupled to a telecommunications switch or gateway, such as a mobile switching center (MSC) and/or a packet data serving node (PDSN) for instance. The switch or gateway may then be coupled with a transport network, such as the PSTN or a packet-switched network (e.g., the Internet).

When an access terminal (such as a cellular telephone, pager, or appropriately equipped portable computer, for instance) is positioned in a cell, the access terminal (also referred to herein by "AT") communicates via an RF air interface with the BTS antenna of the cell. Consequently, a communication path is established between the AT and the transport network, via the air interface, the BTS, the BSC and the switch or gateway. Functioning collectively to provide wireless (i.e., RF) access to services and transport in the wireless communication system, the BTS, BSC, MSC, and PDSN, comprise (possibly with additional components) what is typically referred as a Radio Access Network (RAN).

As the demand for wireless communications has grown, the volume of call traffic in most cell sites has correspondingly increased. To help manage the call traffic, most cells in a wireless network are usually further divided geographically into a number of sectors, each defined respectively by radiation patterns from directional antenna components of the respective BTS, or by respective BTS antennas. These sectors can be referred to as "physical sectors," since they are physical areas of a cell site. Therefore, at any given instant, an access terminal in a wireless network will typically be positioned in a given physical sector and will be able to communicate with the transport network via the BTS serving that physical sector.

As an access terminal moves between wireless coverage areas of a wireless communication system, such as between cells or sectors, or when network conditions change or for other reasons, the AT may "hand off" from operating in one coverage area to operating in another coverage area. In a usual case, this handoff process is triggered by the access terminal monitoring the signal strength of various nearby available coverage areas, and the access terminal or the BSC (or other controlling network entity) determining when one or more threshold criteria are met. For instance, the AT may continuously monitor signal strength from various available sectors and notify the BSC when a given sector has a signal strength that is sufficiently higher than the sector in which the AT is currently operating. The BSC may then direct the AT to hand off to that other sector.

In some wireless communication systems or markets, a wireless service provider may implement more than one type of air interface protocol. For example, a carrier may support one or another version of CDMA, such as EIA/TIA/IS-2000 Rel. 0, A, and CDMA 2000 Spread Spectrum Systems Revision E (either hereafter referred to generally as "IS-2000") for both circuit-cellular voice and data traffic, as well as a more exclusively packet-data-oriented protocol such as EIA/TIA/IS-856 Rel. 0, A, or other version thereof (hereafter "IS-856"). Access terminals operating in such systems may be capable of communication with either or both protocols, and may further be capable of handing off between them, in addition to being able to hand off between various configurations of coverage areas.

OVERVIEW

An AT receives data from a base station on a "forward link" and sends data to the base station on a "reverse link." Hence, on the forward link, the base station transmits and the access terminal receives, while on the reverse link, the access terminal transmits and the base station receives. Under CDMA and related protocols, the transmission power of a "sending entity" (base station on the forward link, access terminal on the reverse link) is adjusted according to an adaptive power-control protocol that uses to a form of feedback from a "receiving entity" (access terminal on the forward link, base station on the reverse link). Specifically, the receiving entity monitors an error rate of data received from a particular sending entity in order to responsively set a target power level of received power from the particular sending entity that needs to be achieved in order to maintain the error rate at some preset, acceptable level. As operating conditions change, the receiving entity may adjust the target power level accordingly. The receiving entity also continually compares the actual received power from the particular sending entity with the target power level, and then sends power-control commands to the particular sending entity that instruct the particular sending entity to adjust its transmission power level so as to achieve the target power level, as measured at the receiving entity. The error-rate monitoring and setting of the target power level are carried out on a time scale that is long compared with that used for sending the power-control commands. Thus, the setting of the target power level is aimed at responding to relatively gradual changes in received-power requirements, while the power-control commands are aimed at relatively rapid achievement of received-power requirements once they have been determined according to the target power level.

Each power-control command is typically either a "power-increment" command, instructing the sending entity to increase its transmission power by a small amount, or a "power-decrement" command, instructing the sending entity to decrease its transmission power by a small amount. In practice, the receiving entity sends a continuous stream or sequence of periodic power-control commands to the sending entity. The process of achieving the received-power at the target power level at the receiving entity can be thought of conceptually as a sort of "coarse" adjustment that brings the actual received power to near-convergence with the target power level, followed by continuous "fine" adjustments aimed at keeping the actual received power very close to the target power level (until another coarse adjustment becomes necessary). The coarse adjustment compensates for roughly discontinuous shifts between the actual received power and the target power level (e.g., when the target power level is adjusted, or operating conditions suddenly change), and typically entails the sending entity responding to a sequence of consecutive power-increment commands or consecutive power-decrement commands from the receiving entity. The fine adjustments generally comprise a sequence of alternating power-increment and power-decrement commands that cause the actual received power to fluctuate slightly above and below the target power level as the sending entity sequentially responds to each command.

The receiving entity monitors the error rate of transmissions received from a given sending entity according to its ability (or lack thereof) to successfully decode those received transmissions and recover the information carried therein. On the reverse link from a given access terminal to a base station, data are typically transmitted in units of frames, and the base station measures the received error rate in terms of its ability to decode individual frames. Each frame corresponds to a specific time window, and the amount of data carried in a frame depends on the particular encoding scheme employed. Decoding of received transmissions is carried out on a frame-by-frame basis, whereby a given frame is deemed in error if it is not successfully recovered by the end of the corresponding frame time window. The base station may then increase the target power level applied to the given access terminal in response to a single frame error or to an error rate averaged over a number of frames. In turn, the base station will issue power-increment commands to the given access terminal that cause the access terminal to increase its reverse-link transmission power, thereby improving the base station's ability to decode subsequent frames from the given access terminal. At the same time, however, the increased reverse-link transmission power will also contribute to generally increased interference on all of the reverse links to the base station.

Recent technological advances have led to improved efficiency of air interface resources of wireless communication systems. In particular, an ability to subtract various sources of noise and interference from a received transmission from a given access terminal can be applied to a period of extended frame decoding that begins when a nominal frame period ends in unsuccessful decoding. By doing so, the received frame can sometimes be successfully decoded during the extended decoding interval, thereby increasing the rate of successful reception of reverse-link data. At the end of the extended decoding interval, the target power level for the given access terminal may be increased if decoding was still unsuccessful or if all or most of the extended decoding interval was required to recover the frame. Alternatively, if a frame is successfully decoded sufficiently early in an extended decoding interval, the base station can retain the current target power level for the access terminal, thereby helping to avoid additional contributions to reverse-link interference that would otherwise result.

An extended decoding interval only occurs if decoding during the nominal frame period that precedes it fails to successfully decode a frame. To the extent that this failure reflects RF operating conditions of the access terminal that transmitted the frame, the next frame transmission, which begins when the extended decoding period begins, may be subject to the same or similar conditions that contributed to the failed decoding of the previous frame. That is, the extended decoding interval that applies to one frame runs concurrently with the nominal frame period of the next. Since any increase in the target power level that may ultimately be warranted will not take effect until the end of the extended decoding interval, any advantage of such an increase to decoding during the concurrently-running nominal frame period cannot be derived until at least the end of the extended decoding interval. Yet, the very occurrence of the extended decoding interval indicates that an increase in the target power level might be warranted. It would therefore be desirable to begin providing the benefit of increasing the target power level at the start of the extended decoding interval in such a manner that does not also lead to excessive or unnecessary increases in reverse-link interference, especially when successful extended interval decoding is achieved before the end of an extended decoding interval.

Accordingly, example methods and systems are disclosed for adjusting the target power level applied to power control during an extended decoding interval following unsuccessful decoding in the preceding nominal frame interval. In the context of the specific CDMA power-control protocols that apply to the generalized description above, the target power level is commonly referred to as the "setpoint" (for reasons discussed below). The methods and systems described herein may therefore be considered as dynamic setpoint adjustment during an extended frame decoding.

Hence in one respect, various embodiments of the present invention provide, in a base station having an air interface, a method comprising: during a nominal time interval equal to one frame, receiving a transmission on the air interface from an access terminal being served by the base station; upon completion of the nominal time interval, making a determination that the transmission has not been successfully decoded into a frame of data; and in response to making the determination, for each of successive additional time intervals during which a continued attempt to decode the transmission remains unsuccessful, incrementing a target power level for received transmissions from the access terminal.

In another respect, various embodiments of the present invention provide, in a base station comprising: means for receiving a transmission on an air interface from an access terminal being served by the base station during a nominal time interval equal to one frame; means for making a determination that the transmission has not been successfully decoded into a frame of data upon completion of the nominal time interval; and means for incrementing a target power level for received transmissions from the access terminal for each of successive additional time intervals during which a continued attempt to decode the transmission remains unsuccessful.

In yet another respect, various embodiments of the present invention provide, in a tangible computer-readable medium having stored thereon computer-executable instructions that, if executed a processor of a base station, cause the base station to perform functions comprising: during a nominal time interval equal to one frame, receiving a transmission on an air interface from an access terminal being served by the base station; upon completion of the nominal time interval, making a determination that the transmission has not been successfully decoded into a frame of data; and in response to making the determination, for each of successive additional time intervals during which a continued attempt to decode the transmission remains unsuccessful, incrementing a target power level for received transmissions from the access terminal.

These as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate the invention by way of example only and, as such, that numerous variations are possible. For instance, structural elements and process steps can be rearranged, combined, distributed, eliminated, or otherwise changed, while remaining within the scope of the invention as claimed.

DETAILED DESCRIPTION

The present invention will be described by way of example with reference to Code Division Multiple Access ("CDMA") communications in general, and to IS-856 and IS-2000 communications in particular. As described below, IS-2000 applies to both circuit-cellular and packet-data communications, and is referred to herein as "conventional" CDMA communications. IS-856 applies more exclusively to packet-data communications (including, e.g., real-time voice and data applications), and is referred to herein as "high rate" packet-data communications. It should be understood that the present invention can apply to other wireless voice and data protocols including, without limitation, IS-95 and GSM, which, together with IS-856 and IS-2000 are considered herein, individually or in combination, to comprise a CDMA family of protocols.

Figure 1:
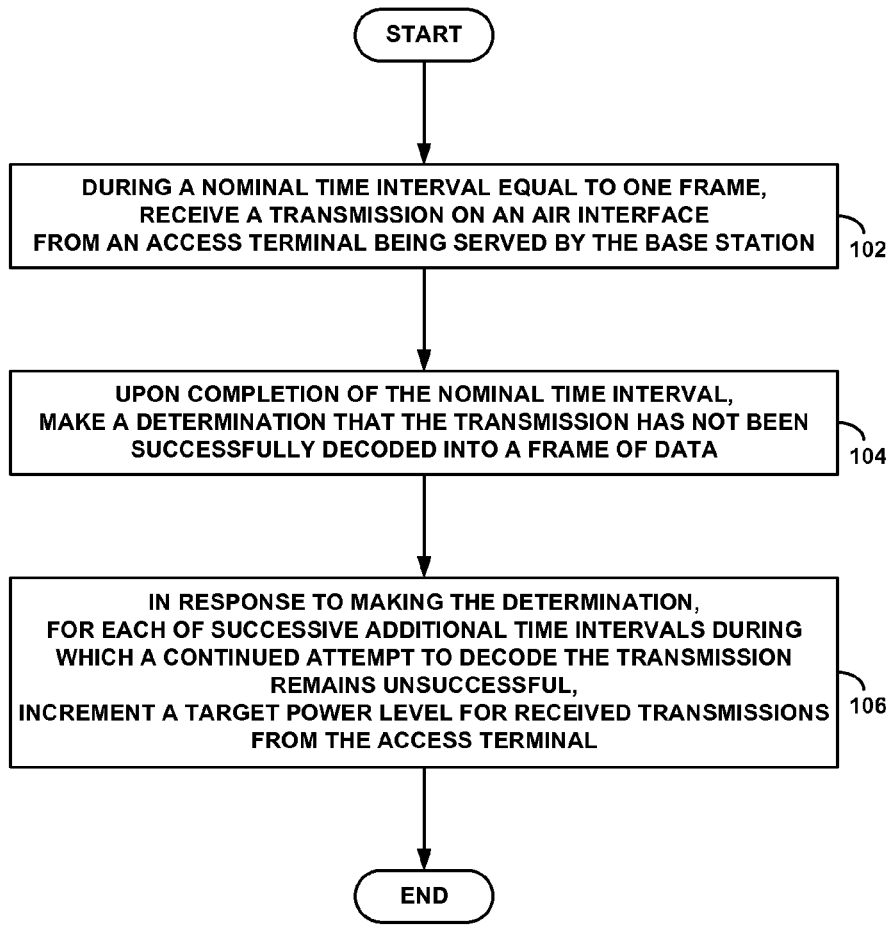
FIG. 1 is a flowchart illustrating an example embodiment of dynamic setpoint adjustment during extended frame decoding.

FIG. 1 is a flowchart illustrating an example method of dynamic setpoint adjustment during extended frame decoding. By way of example, the method could be carried out by a base station or other RAN element that operates according to a CDMA family of protocols, including at least CDMA 2000 Spread Spectrum Systems Revision E. Further, the base station may be considered as serving an access terminal that also operates according to a CDMA family of protocols.

At step 102, during a nominal time interval equal to one frame, the base station receives a transmission from the access terminal. As described above and further explained below, under IS-2000 and related protocols, an access terminal transmits data on its reverse link to its serving base station in units of frames. One frame is typically 20 milliseconds (ms) in duration, though the embodiments of the present invention are not limited to this frame duration. As such, the nominal time interval of step 102, referred to herein as a "nominal frame period," corresponds to a time window within which the base station expects the transmission from the access terminal to be carrying one frame of encoded data.

At step 104, upon completion of the nominal time interval (i.e., at the end of the nominal frame period), the base station makes a determination that the transmission received at step 102 has not been successfully decoded into a frame of data. Ideally, the base station would have successfully decoded the transmission into a frame of date, so the determination at step 104 of failure to decode the transmission corresponds to a frame error. While strictly speaking, a "nominal frame period" simply defines a time interval equal to one frame, for purposes of the present discussion, a nominal frame period that ends in a frame error will be referred to herein as a "failed" or "unsuccessful" nominal frame period. Conversely, a nominal frame period that ends in a successfully decoded frame will be referred to herein as a "successful" nominal frame period. This terminology reflects both the outcome of the decoding effort as well as the duration of the nominal time interval. Thus the determination at step 104 corresponds to the determination of an unsuccessful nominal frame period.

At step 106, in response to making the determination of an unsuccessful nominal frame period, the base station then begins an extended frame decoding interval during which the base station dynamically adjusts a target power level for received transmissions from the access terminal. In accordance with the example embodiment, the extended frame decoding interval begins when the unsuccessful nominal frame period ends, and comprises successive additional time intervals during each of which the base station increments the target power level if a continued attempt to decode the transmission in that time interval remains unsuccessful. The successive additional time intervals comprise a maximum number of successive additional time intervals for continued attempts to decode the transmission, wherein the total amount of time corresponding to the maximum number of successive additional time intervals is equal to the total duration of the extended frame decoding interval. By incrementing the target power level for each of the successive additional time intervals during which a continued attempt to decode the transmission remains unsuccessful, the base station carries out a gradual increase of the target power level over the course of the extended frame decoding interval. In practice, the total duration of the extended frame decoding interval will be less that the duration of a nominal frame period. For instance, the duration of the extended frame decoding interval may be 5-10 ms, compared with a typical nominal frame period of 20 ms.

In further accordance with the example embodiment, the target power level corresponds to a level of received transmission power that the base station requires from the access terminal in order to be able to maintain a given target frame error rate. In a wireless communication system that operates according 1X-RTT or other CDMA-related protocols, the target power level corresponds to a "setpoint" of an outer-loop of the power-control protocol. As described below, the base station issues power-control commands to the access terminal as part of an inner-loop of the power-control protocol, in order to cause the received transmission power to achieve (or nearly achieve) the setpoint. In conventional operation, the base station may adjust the setpoint for a given access terminal in response to the frame error rate for transmissions from the given access terminal, but does not do so dynamically over the course of an extended frame decoding interval.

More specifically, under CDMA 2000 Spread Spectrum Systems Revision E, among other CDMA-related protocols, a base station begins an extended frame decoding interval at the end of an unsuccessful nominal frame period, but by convention does not make an adjustment, if any, to the setpoint until at least the end of the extended frame decoding interval. The end of the nominal frame period is conventionally referred to as the "nominal termination target," and the end of the extended frame decoding interval is conventionally referred to as the "virtual termination target." At the instant corresponding to the nominal termination target, the next frame transmission begins, and at the same time decoding of the previous frame continues (assuming failure to decode during the previous nominal frame period). Thus, in conventional operation, in the time between the nominal and virtual termination targets, when it is already known that a previous frame error has occurred, the decoding of the new frame transmission (i.e., the current nominal frame period) derives no possible benefit from an increased setpoint value.

In accordance with the example embodiment, the base station assesses the success or failure of continued decoding during each of the successive additional time intervals following the nominal termination target, and for each one in which frame decoding remains unsuccessful, the base station increments the setpoint. At the first occurrence of either successful decoding or the virtual termination target (i.e., the maximum number of successive additional time intervals), the base station ceases incrementing the setpoint. In this way, the base station increases the setpoint in a series of incremental steps over the course of the extended frame decoding interval. If successful decoding is achieved prior to the virtual termination target, the base station may either revert to the setpoint value that was in place at the nominal termination target, or retain the most recent value in place at the time of successful decoding of the frame. If successful decoding is not achieved until the virtual termination target, or is not achieved even by the virtual termination target, the setpoint will have been incremented to a maximum increased value. In any case, the transmission being received and decoded during the current nominal frame period will advantageously benefit from the dynamic adjustment of the setpoint during the extended decoding interval. At the same time, the gradual increase in the setpoint value allows the benefit to be derived while avoiding significant and possibly unnecessary contribution to reverse link interference that can result from the increase transmission power from the access terminal associated with the increased setpoint.

In further accordance with the example embodiment, the setpoint increment applied in each of the successive additional time intervals is determined according to a power increment function that describes an increase in power as a function of time between the nominal and virtual termination targets. Taking the target power level to have a "nominal value" during the nominal frame period, and defining a "maximum increased value" at the virtual termination target (i.e., a maximum value that would be set if extended decoding lasts the entire extended decoding interval), the power increment function specifies how the setpoint increases from the nominal value to the maximum increased value as a function of time over the course of the extended decoding interval. Applying the term "increased value" to a setpoint adjustment in any given successive additional time interval that does not yield successful decoding, the power increment function, also referred to herein as the "setpoint adjustment function," specifies increase value as a function of additional time interval.

By way of example, the setpoint adjustment function could be linear from the nominal value to the maximum increased value. Alternatively, the function could be linear from the nominal value to a value smaller than the maximum increased value (i.e., a slower rate of increase). As a further alternative, the function need not even be linear. In any case, the increment applied during any particular one of the successive additional time intervals in which decoding remains unsuccessful could be determined by the value of the setpoint adjustment function at the start or end (or some mid-point) of the particular successive additional time interval. Note that an increment could also be applied at the nominal termination target; i.e., immediately upon a determination of an unsuccessful nominal frame period.

As described above, the extended decoding interval can be considered as being subdivided into the successive additional time intervals; the first of the additional time intervals begins at the nominal termination target, and the last ends at the virtual termination target. Continued decoding in any one of the additional time intervals is carried out only if decoding in the immediately preceding additional time interval was unsuccessful. Thus, at least the first of the successive additional time intervals will be used for continued decoding, since the extended decoding interval is entered only if the preceding nominal frame period is an unsuccessful nominal frame period. Accordingly, fewer than the maximum number of successive additional time intervals may be needed, if successful decoding is achieved prior to the virtual termination target. Correspondingly, the setpoint value reached upon successful decoding may be smaller than the maximum increased value. Furthermore, if fewer than the maximum number of successive additional time intervals are used, the setpoint value may be reverted to the nominal value used during decoding in the previous (failed) nominal frame period.

In practice, the transmission power level on the air interface between the base station and any particular access terminal is typically specified as a gain level, x, according to the relation $x \; dBm = 10 \log_{10}(P/1 \; mW)$, where P is the power in mW (milliwatts). Additionally, each incremental amount or decremental amount of either setpoint value or power-command adjustment is typically specified in dB with respect to the current level. Typically, each increment or decrement is in some multiple of 1. For instance, a 3 dB change (up or down) corresponds to a factor of two in absolute power (increase or decrease).

It will be appreciated that the steps of FIG. 1 are presented by way of example, and that additional and/or alternative steps or alternative ordering of steps could be carried out and still remain within the scope and spirit of the present invention or embodiments thereof.

Figure 2:
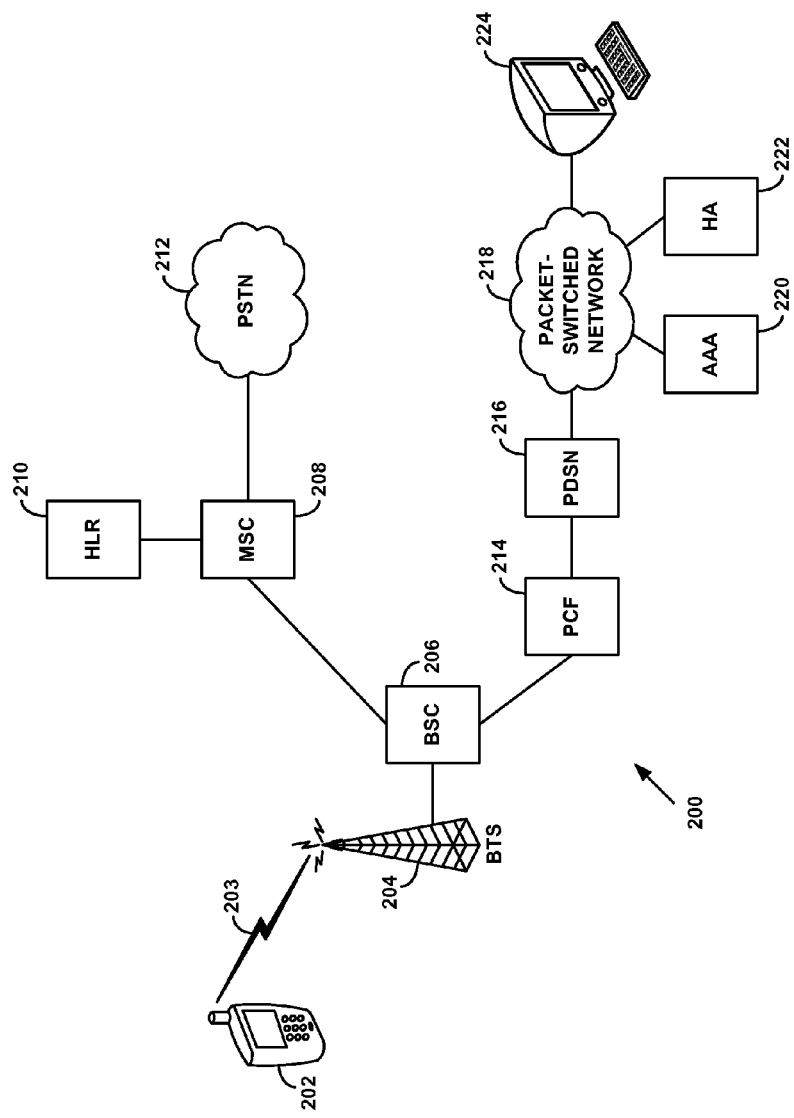
FIG. 2 is a simplified block diagram of a wireless communication system in which example embodiments of dynamic setpoint adjustment during extended frame decoding can be employed.

FIG. 2 shows a simplified block diagram of a wireless communication system 200 in which an example embodiment of dynamic setpoint adjustment during extended frame decoding can be employed. Access terminal AT 202 communicates over an air interface 203 with a BTS 204, which is then coupled or integrated with a BSC 206. Transmissions over air interface 203 from BTS 204 to AT 202 represent the forward link to the access terminal (also referred to herein alternatively as the forward link from the base station, and as "the AT's forward link"). Transmissions over interface 203 from AT 202 to BTS 204 represent the "reverse link" (also referred to herein as "the AT's reverse link") It will be appreciated that the arrangement shown in the figure is illustrative.

BSC 206 is connected to MSC 208, which acts to control assignment of air traffic channels (e.g., over air interface 203), and provides access to wireless circuit-switched services such as circuit-voice and circuit-data (e.g., modem-based packet data) service. As represented by its connection to PSTN 212, MSC 208 is also coupled with one or more other MSCs or other telephony circuit switches in the operator's (or in a different operator's) network, thereby supporting user mobility across MSC regions, and local and long-distance landline telephone services. Also connected to MSC 208 is home location register (HLR) 210, which supports mobility-related aspects of subscriber services, including dynamic tracking of subscriber registration location and verification of service privileges.

As shown, BSC 206 is also connected with a PDSN 216 by way of packet control function (PCF) 214. PDSN 216 in turn provides connectivity with a packet-switched network 218, such as the Internet and/or a wireless carrier's private core packet-network. Sitting as nodes on network 218 are, by way of example, an authentication, authorization, and accounting (AAA) server 220, a mobile-IP home agent (HA) 222, and a remote computer 224. After acquiring an air traffic channel over its air interface, an access terminal (e.g., AT 202) may send a request to PDSN 216 for a connection in the packet data network. Then, following authentication of the access terminal by AAA server 220, the access terminal may be assigned an IP address by the PDSN or by HA 222, and may thereafter engage in packet-data communications with entities such as remote computer 224.

It should be understood that the depiction of just one of each network element in FIG. 2 is illustrative, and there could be more than one of any of them, as well as other types of elements not shown. The particular arrangement shown in FIG. 2 should not be viewed as limiting with respect to the present invention or embodiments thereof. Further, the network components that make up a wireless communication system such as system 200 are typically implemented as a combination of one or more integrated and/or distributed platforms, each comprising one or more computer processors, one or more forms of computer-readable storage (e.g., disks drives, random access memory, etc.), one or more communication interfaces for interconnection between elements and the network and operable to transmit and receive the communications and messages described herein, and one or more computer software programs and related data (e.g., machine-language instructions and program and user data) stored in the one or more forms of computer-readable storage and executable by the one or more computer processors to carry out the functions, steps, and procedures of the various embodiments of the present invention described herein. Similarly, a communication device such as exemplary access terminal 202 typically comprises a user-interface, I/O components, a transceiver, a communication interface, a tone detector, a processing unit, and data storage, all of which may be coupled together by a system bus or other mechanism. As such, system 200, AT 202, and air interface 203 are representative of exemplary means of implementing and carrying out the various functions, steps, and procedures described herein.

Throughout this description, the term "base station" will be used to refer to a Radio Access Network (RAN) element such as a BTS, a BSC, or combination BTS/BSC, for instance. The term "radio network controller" (RNC) can also be used to refer to a BSC, or more generally to a base station. In some arrangements, two or more RNCs may be grouped together, wherein one of them carries out certain control functions of the group, such as coordinating handoffs across BTSs of the respective RNCs in the group. The term controlling RNC (or C-RNC) customarily applies to the RNC that carries out these (and possibly other) control functions.

1. Conventional CDMA Communications

In a conventional CDMA wireless network compliant with the well known IS-2000 standard, each cell employs one or more carrier frequencies, typically 1.25 MHz in bandwidth each, and each wireless service sector is distinguished from adjacent sectors by a pseudo-random number offset ("PN offset"). Further, each sector can concurrently communicate on multiple different channels, distinguished from each other by "Walsh codes." When an access terminal operates in a given sector, communications between the access terminal and the BTS of the sector are carried on a given frequency and are encoded by the sector's PN offset and a given Walsh code.

Air interface communications are divided into forward link communications, which are those passing from the base station to the access terminal, and reverse link communications, which are those passing from the access terminal to the base station. In an IS-2000 system, data are transmitted in units of frames on both the forward link and reverse link. On either link, communications in a given wireless service sector are encoded with the sector's PN offset and a given Walsh code. On the forward link, certain Walsh codes are reserved for use to define control channels, including a pilot channel, a sync channel, and one or more paging channels, and the remainder can be assigned dynamically for use as traffic channels, i.e., to carry user communications. Similarly, on the reverse link, one or more Walsh codes may be reserved for use to define access channels, and the remainder can be assigned dynamically for use as traffic channels.

In order to facilitate efficient and reliable handoff of access terminals between sectors, under IS-2000 an AT can communicate on a given carrier frequency with a number of "active" sectors concurrently, which collectively make up the AT's "active set." Depending on the system, the number of active sectors can be up to six (currently). The access terminal receives largely the same signal from each of its active sectors and, on a frame-by-frame basis, selects the best signal to use. An AT's active set is maintained in the access terminal's memory, each active sector being identified according to its PN offset. The AT continually monitors the pilot signals from its active sectors as well as from other sectors, which may vary in as the AT moves about within the wireless communication system, or as other factors cause the AT's RF conditions to change. The AT reports the received signal strengths to the serving base station, which then directs the AT to update its active set in accordance with the reported strengths and one or more threshold conditions.

As described above, frames are transmitted from the base station to the AT or from the AT to the base station at regular intervals (corresponding to a frame rate), typically 20 milliseconds in duration (although other frame intervals can be used). As a result of imperfect transmission, noise, interference, or other operational factors, some frames received by the AT on the forward link or by the base station on the reverse link may contain errors. Other frames—ideally, the majority of them—will be received without errors. It may also be possible through one or another coding technique to correct certain errors in frames.

On either link, the receiving entity (e.g., AT or base station) can compute a ratio of (i) the number of error-containing frames received during a given period of time to (ii) the total number of frames received during the same period of time. This ratio, computed by the AT on the forward link and by the base station on the reverse link, is called the frame error rate (FER). The FER is an indicator of the RF conditions of the forward and/or reverse link, and consequently the quality service provided over the respective link. For instance, frame errors may manifest as lost audio samples, which in turn cause choppy or distorted audio output when played out by a receiving device. Similarly, frame errors may represent packet-data loss that results in retransmissions and lower overall throughput. In general, the higher the FER, the lower the quality of service will be, and vice versa. For a given set of physical conditions underlying communications between a base station and an access terminal, the higher the transmission power on the link (forward or reverse), the lower the FER will be. Consequently, the quality of service provided on a link can be adjusted and/or controlled by adjusting the transmission power used on the link.

In order to support concurrent communication in multiple channels on a common frequency, each channel is allocated a fraction of the total forward-link power available in the sector. The power allocated to each channel is determined so as to optimize the signal-to-noise characteristics of all the channels, and may vary with time according to the number of access terminals being serviced, and their relative positions with respect to the BTS, among other factors. Similarly, on the reverse links, each access terminal transmits at a power level that optimizes the signal-to-noise while minimizing interference with other access terminals.

In practice, similar methods of power control are implemented on both the forward and reverse links. For each link, two interrelated schemes are employed. The first, called "inner-loop" power control, achieves rapid convergence of link power to a level corresponding to a threshold signal-to-noise ratio (SNR). The second, called "outer-loop" power control, operates on a much longer time scale (i.e., more slowly) than the inner loop, and adjusts the inner-loop threshold SNR in response to the computed FER. Thus the outer loop adjusts the SNR threshold to attain a desired quality of service (as measured by FER), while the inner loop adjusts the link power to quickly achieve (at least approximately) the SNR threshold set by the outer loop. Since the protocols are similar for both the forward and reverse links, it sufficient for the present purposes to describe the details of power control with reference only the reverse link.

More specifically, for inner-loop power control, the base station measures (for each reverse link) SNR at a rate of 800 times per second (although other rates are possible), each SNR measurement being made in terms of $E_b/N_0$, where $E_b$ is the energy per bit of the signal received by the AT and the $N_0$ is the noise power spectral density. For each measurement, the base station compares $E_b/N_0$ with a threshold value called $(E_b/N_0)_{setpoint}$ and responsively sets and sends a power control bit to the AT in order to affect a power adjustment. Note that $(E_b/N_0)_{setpoint}$ is the same parameter referred to simply as "setpoint" in the discussion of FIG. 1 above; the terms "$(E_b/N_0)_{setpoint}$" and "setpoint" will thus be used interchangeably hereinafter.

In practice, power adjustment is applied in terms of gain relative to a current power level, and measured in dB. For $E_b/N_0 \leq (E_b/N_0)_{setpoint}$, the base station sets the power control bit to "power up," and, in conventional operation, the AT responsively increases the reverse link gain by a small amount (typically 1 dB or less). For $E_b/N_0 > (E_b/N_0)_{setpoint}$, the base station sets the power control bit to "power down," and, in conventional operation, the AT responsively decreases the reverse link gain by the same small amount. In this manner, the reverse link power rapidly converges, in small increments or decrements, to a level where $E_b/N_0 \approx (E_b/N_0)_{setpoint}$, and thereafter fluctuates about $(E_b/N_0)_{setpoint}$ until $(E_b/N_0)_{setpoint}$ is adjusted to a new value by outer-loop power control, or operating conditions change such that $E_b/N_0$ diverges from $(E_b/N_0)_{setpoint}$.

Each transmission by the base station of the power control bit set to power up is commonly referred to as a "power-up command." Similarly, each transmission of the power control bit set to power down is referred to as a "power-down command." Power-up commands are specific examples of the more generically-termed power-increment commands described above, and power-down commands are specific examples of the more generically-termed power-decrement commands described above.

For outer-loop power control on the reverse link, the base station computes the FER within consecutive calculation windows, each being an integer number of frames in duration. Thus, in each calculation window, FER may be expressed as the number of frames with errors divided by the number of frames per window. The duration of a calculation window typically ranges from one to 20 frames, although other calculation window sizes (number of frames per window) could be used. For each calculation window, the base station compares the computed FER with a reverse-link Target FER (TFER). If the computed FER is less than TFER, the base station decreases $(E_b/N_0)_{setpoint}$. Conversely, if the computed FER is greater than TFER, the base station increases $(E_b/N_0)_{setpoint}$. In this manner, a computed FER that exceeds the target FER drives the inner-loop power control to increase the reverse-link power, while a computed FER that is below the target FER drives the inner-loop power control to decrease the reverse-link power.

Note that a shorter calculation window will be more sensitive to short-term variations that effect RF conditions but will also allow the base station to react more quickly to these variations, while a longer calculation window will tend to average over short-term variations while possibly delaying responsiveness to non-transient changes in RF conditions. For a one-frame calculation window, setpoint adjustment can be sensitive to the shortest possible timescale. In this case, calculation does not directly yield an observed frame error rate, but an historical average may still be tracked.

In the context of a CDMA family of protocols, the power control methods described in the preceding are sometimes referred to as "inner-loop power-control protocols" and "outer-loop power-control protocols." It should also be noted that additional or alternative methods of power control may be applied to either of the forward or reverse links.

With arrangement described above, an access terminal can engage in cellular voice or packet-data communications. Referring again to FIG. 2, and taking an originating call from AT 202 as an example, AT 202 first sends an origination request over air interface 203 and via the BTS 204 and BSC 206 to MSC 208. The MSC then signals back to the BSC directing the BSC to assign an air interface traffic channel for use by the access terminal. For a voice call, the MSC uses well-known circuit protocols to signal call setup and establish a circuit connection to a destination switch that can then connect the call to a called device (e.g., landline phone or another access terminal). For a packet-data session, the BSC signals to the PDSN 316 by way of PCF 214. The PDSN 216 and access terminal 202 then negotiate to establish a data link layer connection, such as a point to point protocol (PPP) session. Further, the PDSN 216 sends a foreign agent advertisement that includes a challenge value to the access terminal, and the access terminal responds with a mobile-IP registration request (MIP RRQ), including a response to the challenge, which the PDSN forwards to HA 222. The HA then assigns an IP address for the access terminal to use, and the PDSN passes that IP address via the BSC to the access terminal.

2. High Rate Packet-Data Communications

Under IS-2000, the highest rate of packet-data communications theoretically available on a fundamental traffic channel of the forward link is 9.6 kbps, dependent in part on the power allocated to the forward-link traffic channel and the resultant signal-to-noise characteristics. In order to provide higher rate packet-data service to support higher bandwidth applications, the industry introduced a new "high rate packet data (HRPD) system," which is defined by industry standard IS-856.

IS-856 leverages the asymmetric characteristics of most IP traffic, in which the forward link typically carries a higher load than the reverse link. Under IS-856, each access terminal maintains and manages an active set as described above, but receives forward-link transmission from only one active sector at a time. In turn, each sector transmits to all its active ATs on a common forward link using time division multiplexing (TDM) in order to transmit to only one access terminal at a time, but at the full power of the sector. As a result of the full-power allocation by the sector, an access terminal operating under IS-856 can, in theory, receive packet-data at a rate of at least 38.4 kbps and up to 2.4 Mbps on its forward link.

The reverse link under IS-856 retains largely the traditional IS-2000 code division multiplexing (CDM) format, albeit with the addition of a "data rate control" (DRC) channel used to indicate the supportable data rate and best serving sector for the forward link. Multiple, active ATs in a common serving sector can transmit concurrently on their respective reverse links to the sector's BTS. Each reverse link comprises distinct code channels, thereby enabling the BTS to distinguish among each AT's transmissions. As with IS-2000, the IS-856 reverse link transmissions are frame-based.

TDM access on the IS-856 forward link is achieved by dividing the forward link in the time domain into time slots of length 2048 chips each. At a chip rate of 1.228 Mega-chips per second, each slot has a duration of 1.67 milliseconds (ms). Each time slot is further divided into two 1024-chip half-slots, each half-slot arranged to carry a 96-chip pilot "burst" (pilot channel) at its center and a Medium Access Control (MAC) channel in two 64-chip segments, one on each side of the pilot burst. The remaining 1600 chips of each time slot (800 per half-slot) are allocated for a forward traffic channel or a forward control channel, so that any given time slot will carry either traffic-channel data (if any exists) or control-channel data. Traffic-channel data comprise user application data, while control-channel data comprise IS-856 control messages. As in IS-2000, each sector in IS-856 is defined by a PN offset, and the pilot channel carries an indication of the sector's PN offset. Also as in IS-2000, an access terminal operating under IS-856 monitors the pilot signal emitted by various sectors in order to facilitate active set management, i.e., as a basis to facilitate handoff from one sector to another.

Unlike the IS-856 forward link which is allocated the full power of the serving sector (or other coverage area) to each AT on a TDM basis, the power applied to the reverse link from each of possibly multiple ATs in a common serving sector is individually controlled by the base station using the same methods described above for IS-2000. In particular, for each active AT in a sector, the serving base station uses a calculated frame error rate to set an outer-loop SNR threshold (i.e., the setpoint), and, in accordance with inner-loop power control protocols, issues appropriate power-control commands—power-up or power-down commands—to cause the $E_b/N_0$ of the signal received from the AT to converge to the threshold. Under IS-856, the $E_b/N_0$ of the signal received from the AT is typically measured 600 times per second (equal to the slot rate), and responsive power-control commands are sent from the base station at the same rate.

Operation in an IS-856 compliant communication system may be illustrated, again with reference to FIG. 2. To acquire packet data connectivity under IS-856, after an access terminal first detects an IS-856 carrier, the access terminal sends to its BSC (or RNC) 206 a UATI (Universal Access Terminal Identifier) request, and receives in response an UATI, which the access terminal can then use to identify itself in subsequent communications with the BSC. The access terminal then sends a connection-request to the BSC 206, and the BSC responsively invokes a process to authenticate the access terminal and to have the access terminal acquire a data link.

In particular, the BSC 206 sends an access request to an Access Network AAA (ANAAA) server (which may be different than the AAA server 220), and the ANAAA server authenticates the access terminal. The BSC 206 then assigns radio resources for the data session, providing a MAC identifier ("MAC ID") to the AT for identifying its time-slot data sent in the forward-link traffic channel, and a Walsh code for a sending data on the reverse-link traffic channel. Further, the BSC signals to the PDSN 216 (via PCF 214), and the PDSN and access terminal then negotiate to establish a PPP data link. In addition, as in the IS-2000 process, the access terminal then sends an MIP RRQ to the PDSN, which the PDSN forwards to the HA 222, and the HA assigns a mobile-IP address for the access terminal to use.

Once the access terminal has acquired an IS-856 radio link, a data link, and an IP address, the access terminal is considered to be in an active mode. In active mode, the AT receives its data distributed across MAC-identified time slots transmitted by the BTS using the full power of the forward link of the sector selected by the AT (as described above). Thus, the access terminal recognizes its time-slot data from among other time slots by a MAC identifier included in each transmission, and processes only those time slots with the AT's assigned MAC identifier. Using the full power of the forward link maximizes the signal-to-noise ratio, thus facilitating higher rate data communication than the power-limited conventional CDMA channels.

3. Dynamic Adjustment of Setpoint During Extended Frame Decoding a. Operating Principles The failure of a base station to successfully decode a frame during a nominal frame period is generally attributable to some combination of imperfect transmission, noise, and interference on the reverse link. With regard to interference in particular, some or all of possibly multiple access terminals with active voice or data sessions that are being served by a common base station (or a common sector, for example) can transmit concurrently on their respective reverse links, though not generally (or necessarily) with synchronicity with respect to frame boundaries. As a consequence, the serving base station must simultaneously decode transmissions from different access terminals, wherein the nominal termination targets of the different, concurrently-transmitted frames from the different access terminals occur at different times. For a given transmission from a given access terminal during a given nominal frame period, all other received transmissions constitute interference, and can contribute to (or even be a predominant factor in) failure of the serving base station to decode the given transmission into a frame as sent by the given access terminal.

If a frame has not been successfully decoded by the end of the given nominal frame period, and attempted decoding of the given transmission ceases at the nominal termination target of the given nominal frame period, then a frame error will result. At this point, the base station may increase the setpoint applied to transmissions from the given access terminal, as described above. While this increase may aid in the decoding of a transmission from the given access terminal during the next nominal frame period, it will also increase the given access terminal's contribution to interference on other the reverse links to the base station.

It may be the case that one or more concurrent transmissions from other access terminals have been successfully decoded into respective frames at some point prior to the nominal termination target of the given nominal frame period, or as some point shortly thereafter. By continuing to decode the given transmission after the nominal termination target of the given nominal frame period, while at the same time computationally subtracting (or otherwise accounting for) the now-known contributions to interference from the successfully decoded frames from the other access terminals, it is possible to still achieve successful decoding of the given transmission. Such an approach to continuing decoding after the nominal termination target is one of the features provided with the introduction of CDMA 2000 Spread Spectrum Systems Revision E, for example.

More specifically, in accordance with conventional operation under CDMA 2000 Spread Spectrum Systems Revision E (among other possible, similarly-compliant, CDMA-related protocols), upon a determination of an unsuccessful nominal frame period, the base station will continue to attempt to decode the transmission of the previous nominal frame period (that resulted in a failed decoding attempt) while concurrently attempting to decode the transmission being received during the next (new) nominal frame period. As described above, the period of continued attempted decoding of the previous transmission is referred to as an extended frame decoding interval, and lasts from the nominal termination target of the unsuccessful nominal frame period until either the previous transmission is successfully decoded or a maximum duration referred to as the virtual termination target, whichever occurs first.

If the entire extended decoding interval is used, either because the entire interval was needed to achieve successful decoding or because decoding remained unsuccessful even by the virtual termination target, the base station may then increase the setpoint applied to transmissions from the given access terminal. If the previous transmission is successfully decoded prior to the virtual termination target, then the base station may forgo increasing the setpoint. In this case, a possible increase in the given access terminal's contribution to interference on the reverse link may be avoided.

Figure 3:
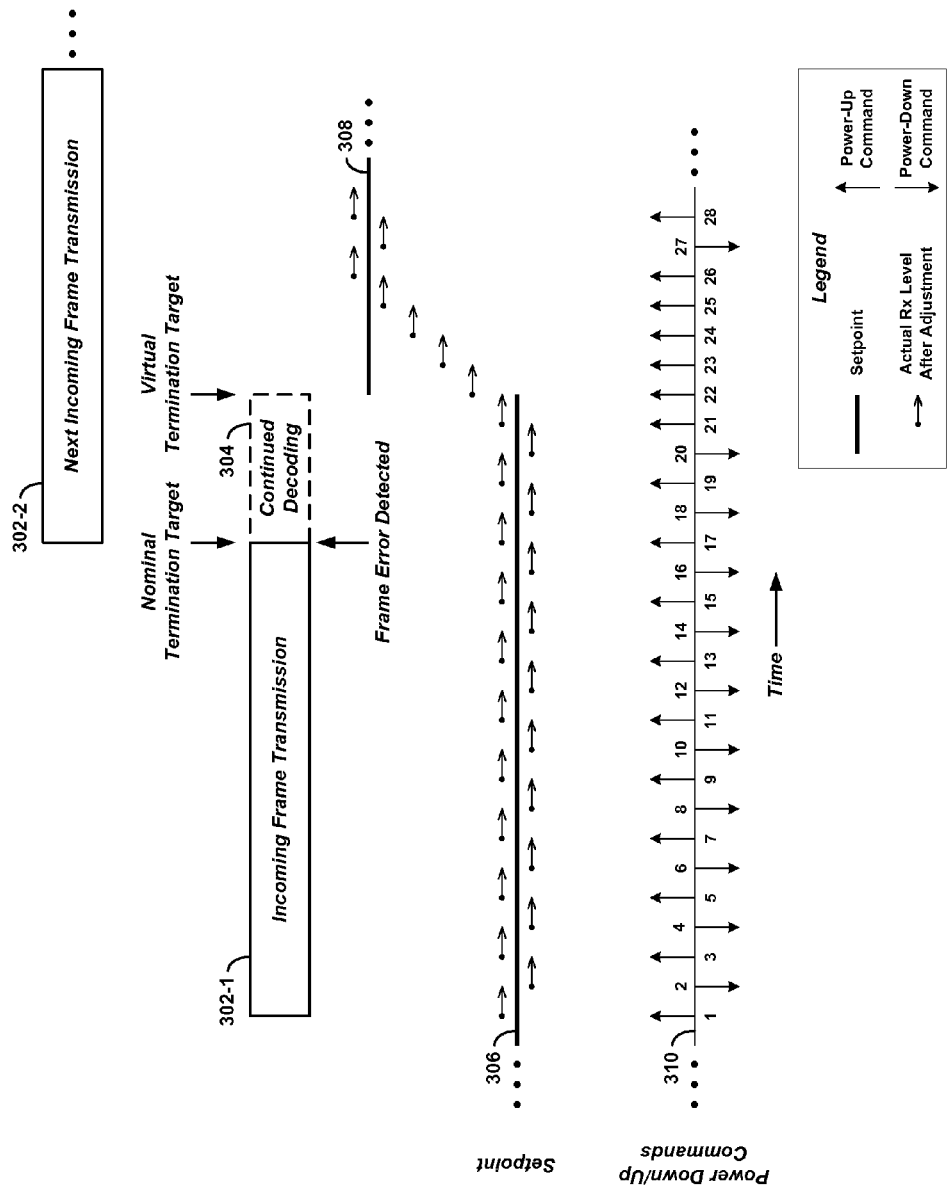
FIG. 3 illustrates an example of conventional setpoint adjustment during extended frame decoding.

FIG. 3 illustrates an example of conventional setpoint adjustment during extended frame decoding according to CDMA 2000 Spread Spectrum Systems Revision E. At the top panel of the figure, an incoming frame transmission 302-1 is being received at the base station from an AT (time increases toward the right, as indicated at the bottom of the figure). As shown, this frame transmission completes at a time marked "Nominal Termination Target," at which point the next incoming frame transmission 302-2 begins. By way of example, the nominal frame period associated with the incoming frame transmission 302-1 is unsuccessful, as indicated by the label "Frame Error Detected" at the nominal termination target. Consequently, an extended decoding interval 304 (labeled "Continued Decoding") for the failed decoding of incoming frame transmission 302-1 begins at the nominal termination target.

The middle panel of FIG. 3 shows the setpoint values as a function of time, as well as the received power levels from the AT as measured by the base station. The bottom panel illustrates the sequence of power-control commands that the base station sends to the AT in response to comparing the received power levels to the setpoint. As indicated in the Legend, the setpoint (target power levels) are represented by thick horizontal lines ("Setpoint" in the Legend). Also as indicated in the Legend, power-up commands are represented by upward-directed arrows, while power-down commands are represented by downward-directed arrows. A number below each power-up command and above each power-down command in the bottom panel corresponds to the order of transmission of the command from the base station, and provides a label for the convenience of the discussion herein. The actual transmission power levels as measured at the base station after the AT increases or decreases the transmission power level in response to a received power-control command are represented in the middle panel by the short, rightward-directed, horizontal arrows ("Actual Rx Level After Adjustment" in the Legend). The dot at the left each arrow is time-aligned with the particular power-control command that caused the AT to make the adjustment. The actual setpoint values are arbitrary, as are the relative amounts of the power level adjustments. Typical values of adjustment are 1 dB up or 1 dB down. However, other amounts of adjustment could be made in response to the commands. It will be appreciated that the particular sequence shown is illustrative, and are not limiting with respect to the present invention or embodiments thereof.

By way of example, the setpoint 306 remains constant during the reception of incoming frame transmission 302-1. Consequently, the power-control commands on timeline 310 alternate between power-up commands #1, 3, 5, . . . , 17 and power-down commands #2, 4, 6, . . . , 16, and the corresponding received power levels alternate above and below the setpoint 306 value. At the nominal termination target, when the extended decoding interval 304 begins, the setpoint 306 remains at the same level, in accordance with conventional operation. In the present example, the extended decoding interval 304 evidently lasts all the way until the virtual termination target, accommodated by alternating power-control commands #18-21, as shown. At the virtual termination target, the setpoint is increased to a new level shown as setpoint 308. As a result, the base station determines that the actual received power level from the AT is below the new setpoint 308, and issues consecutive power-up commands #22-26, which result in the AT increasing is transmitted power until the base station again measures the received power level hovering about the new setpoint 308.

The amount of the increase from setpoint 306 to setpoint 308, referred to herein as the "setpoint jump," can be determined as a system parameter, and may be adjusted according to the target frame error rate. For example, since the increase is applied after just one frame error, then there may not be an actual calculated frame error rate to compare against the target frame error rate in order to decide how to adjust the setpoint. However, the setpoint jump can be specified such that the increase made in response to a single frame error brings a presumed frame error rate into approximate agreement with the target frame error rate.

The use of the entire (or possibly nearly the entire) extended decoding interval may be indicative that the operating conditions of the AT (e.g., interference, noise, etc.) that contributed to the preceding unsuccessful nominal frame period are persisting, at least until the virtual termination target. Increasing the setpoint is meant to help alleviate evident impact of these conditions on decoding by the base station, thereby improving the chances that the next incoming frame transmission 302-2 will be successfully decoded. However, any benefit to decoding the next incoming frame transmission 302-2 derived from the increased setpoint will not accrue until at least the virtual termination target following the previous incoming frame transmission 302-1, since only then will the base station increase the setpoint to the setpoint value 308.

While waiting until the virtual termination target to decide whether or not to increase the setpoint may help avoid unnecessary increases that can negatively impact reverse-link interference, it may also result in lost opportunities to successfully decode the next incoming frame transmission in instances when the setpoint increase is warranted but implemented too late to be of sufficient benefit to decoding. Accordingly, embodiments of the present invention implement a gradual increase of the setpoint in small steps over the course of the extended decoding interval. This approach provides an immediate benefit to decoding the next incoming frame transmission, while helping to minimize unnecessary additional reverse-link interference. In the event that decoding of the previous frame transmission is achieved prior to the virtual termination target, the setpoint value can be kept at a level below the increase corresponding to the virtual termination target, or even reverted to the value at the end of the previous unsuccessful nominal frame period. If the entire extended decoding interval is used, then the setpoint value will be no higher than it would be in the conventional operation described above.

Operation of an example embodiment of dynamic setpoint adjustment during extended frame decoding is described in the next subsection.

b. Example Operation

Figure 4:
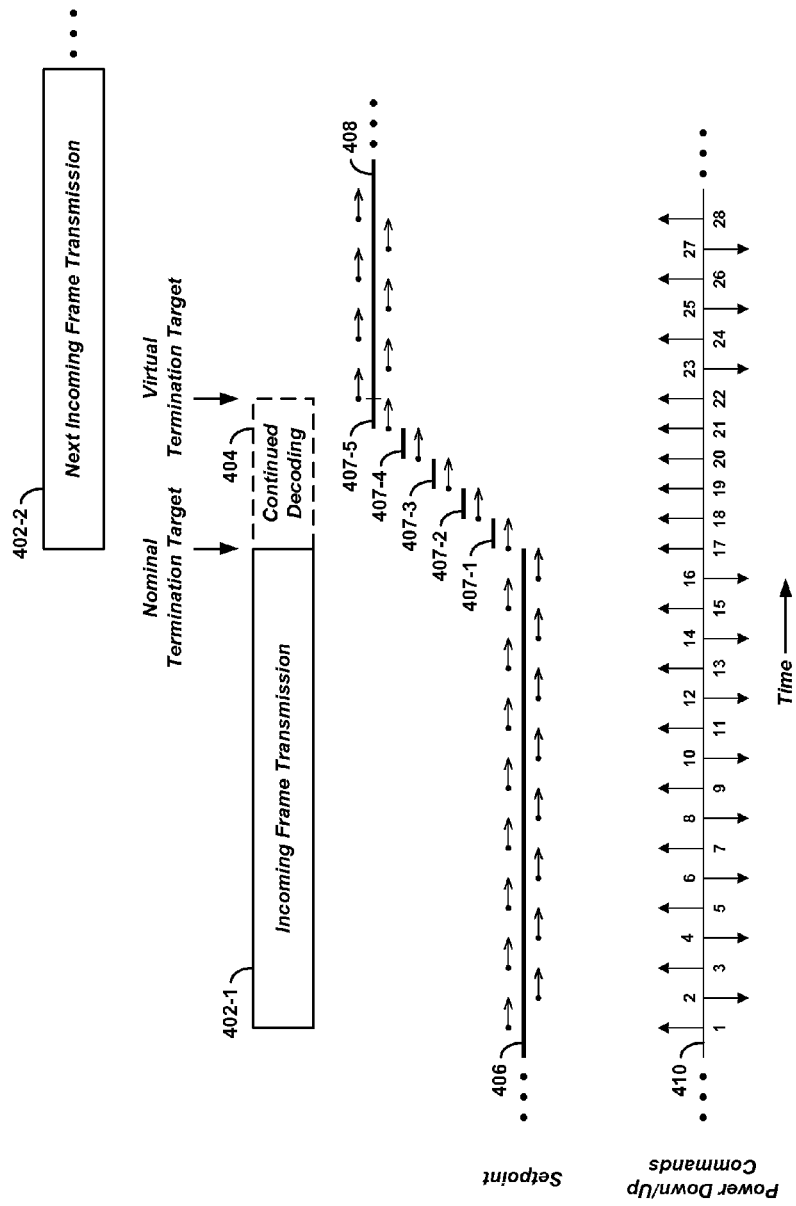
FIG. 4 illustrates an example of operation of dynamic setpoint adjustment during extended frame decoding.

FIG. 4 illustrates the operating principles of an example embodiment dynamic setpoint adjustment during extended frame decoding. The format and the meaning of the symbols shown in FIG. 4 are the same as those used in FIG. 3 (the Legend is omitted for the sake of brevity in FIG. 4). At the top panel of the figure, an incoming frame transmission 402-1 is being received at the base station from an AT (again, time increases toward the right). As shown, this frame transmission completes at a time marked "Nominal Termination Target," at which point the next incoming frame transmission 402-2 begins. By way of example, the nominal frame period associated with the incoming frame transmission 402-1 is unsuccessful. Consequently, an extended decoding interval 404 (labeled "Continued Decoding") for the failed decoding of incoming frame transmission 402-1 begins at the nominal termination target.

As with FIG. 3, middle panel of FIG. 4 shows the setpoint values as a function of time, as well as the received power levels from the AT as measured by the base station, while the bottom panel illustrates the sequence of power-control commands that the base station sends to the AT in response to comparing the received power levels to the setpoint. Operation up until the nominal termination target is the same as in the conventional operation illustrated in FIG. 3. Again by way of example, the setpoint 406 remains constant during the reception of incoming frame transmission 402-1. Consequently, the power-control commands on timeline 410 alternate between power-up commands #1, 3, 5, . . . , 17 and power-down commands #2, 4, 6, . . . , 16, and the corresponding received power levels alternate above and below the setpoint 406 value.

Unlike conventional operation, however, when the extended decoding interval 404 begins at the nominal termination target, the setpoint is increased in a series of intermediate setpoint steps during a corresponding series of successive, intermediate decoding intervals which add up to the total duration of the extended decoding interval. By way of example, five intermediate decoding intervals are shown in the illustration of FIG. 4. It will be appreciated that the extended decoding interval could be subdivided into more or fewer successive intermediate decoding intervals. Each intermediate setpoint step is a fraction of the setpoint jump between setpoint 406 and setpoint 408.

In accordance with operation of the example embodiment, the first intermediate decoding interval begins at the nominal termination target. In the first interval, the setpoint value is increased by intermediate setpoint step 407-1. Since the base station then determines that the received power level from the AT is below the new setpoint, it sends a power-up command #17 to the AT and the AT responsively increases its reverse-link transmission power level, as shown. The base station then determines whether decoding of the incoming frame transmission 402-1 has been successful. If it has, then no further increase in setpoint is necessary, and the new setpoint is either maintained at level 407-1 or is reverted back to setpoint 406.

If decoding has not been successful in the first intermediate decoding interval, then the second intermediate decoding interval begins and the setpoint is increased by intermediate setpoint step 402-2. Again, the base station sends a power-up command (#18 during the second intermediated decoding interval), to which the AT responds by increasing its reverse-link transmission power level. The increase further aids in the decoding of the next incoming frame transmission 402-2, and is warranted by the continued inability of the base station decode the previous incoming frame transmission 402-1 during the first intermediate decoding interval. The process repeats in as many of the intermediate decoding intervals that remain (up to three in the current example) until either the virtual termination target or successful decoding, whichever occurs first.

Assuming the case, then, in which all five of the intermediate decoding intervals of the current example are use, the setpoint will increase in intermediate setpoint steps 407-1, 407-2, 407-3, 407-4, and 407-5, wherein the last step brings the level to setpoint value 408 at the virtual termination target. Thereafter, the setpoint evidently remains constant (at least for the remaining time displayed in the figure). At each of the intermediate steps, a power-up command is sent by the base station to the AT; these are shown as power-up commands #17, 18, 19, 20, and 21. The AT increases its reverse link transmission power level in response to each these power-up commands. Advantageously, the increased transmission power from the AT aids the base station's efforts in decoding of the next incoming frame transmission 402-2, beginning at the nominal termination target. At the same time, the gradual increase in setpoint helps mitigate any impact on reverse-link interference contributed by the AT.

In accordance with the example embodiment, the size of the intermediate setpoint steps are specified in such a manner that their sum adds up to the setpoint jump (i.e., the increase from setpoint 406 to setpoint 408). This can be achieved in a series of equal absolute or equal relative step sizes, for example. For equal absolute step sizes, the setpoint jump expressed in absolute power (e.g. Watts) can be divided into a number of steps equal to the number of intermediate decoding intervals. For equal relative step sizes, the setpoint jump expressed in dB can be divided into a number of steps equal to the number of intermediate decoding intervals. For instance, a setpoint jump of 1 dB can be achieved in five successive steps of 0.2 dB each.

In further accordance with the example embodiment, the intermediate setpoint steps need not follow a strictly linear increase from the nominal setpoint at the nominal termination target to the increased setpoint at the virtual termination target. For instance, the setpoint can increase linearly to a value smaller than the setpoint jump, and then increase in a final step to the setpoint jump at the virtual termination target. More generally, the increase in setpoint from the nominal termination target to the virtual termination target can be described as a setpoint adjustment function that is a function of time. The setpoint adjustment function can be used to determine the intermediate setpoint step increment at each of the successive intermediate decoding intervals.

Figure 5:
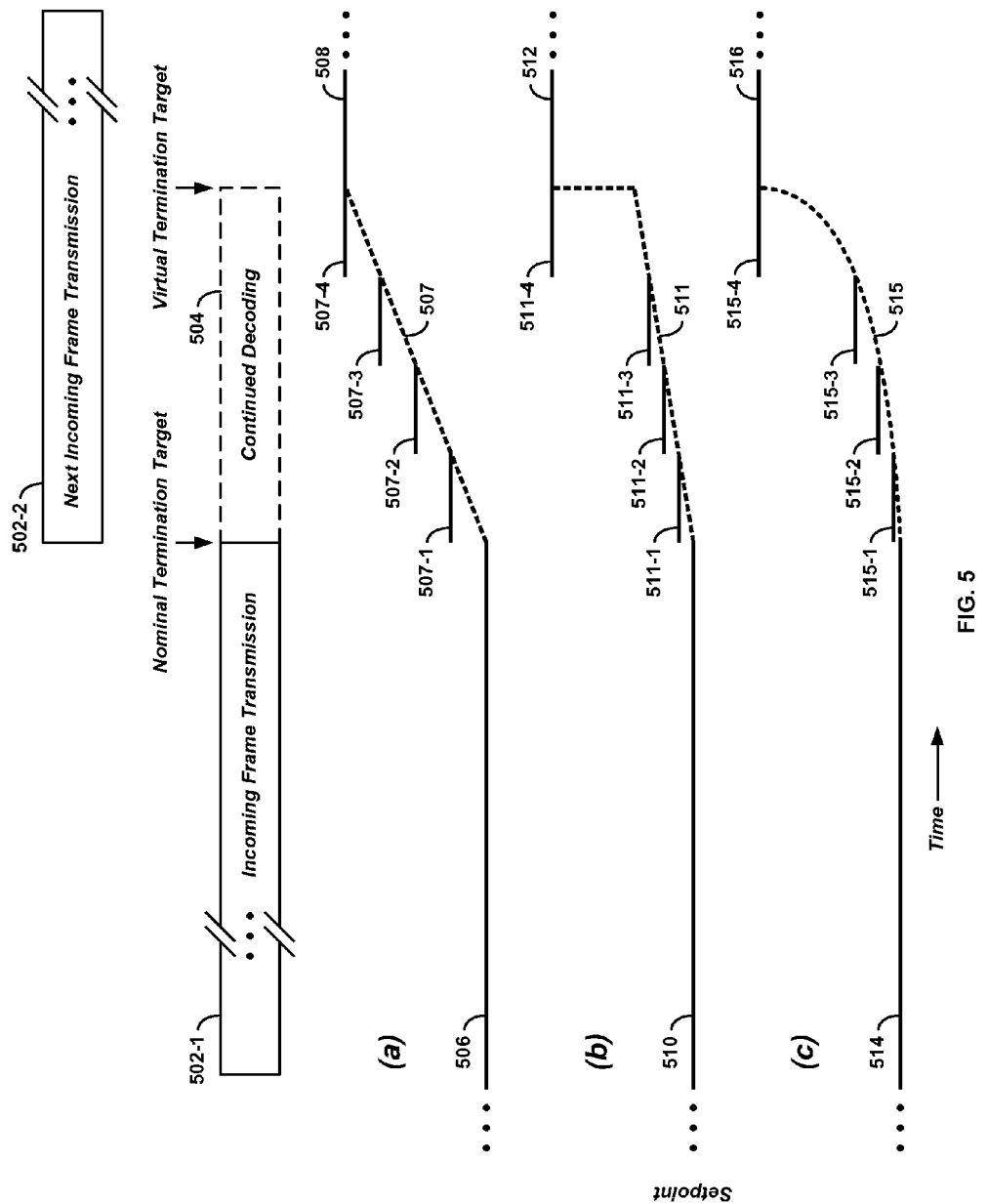
FIG. 5 illustrates three example setpoint adjustment functions applied to operation of dynamic setpoint adjustment during extended frame decoding.

FIG. 5 illustrates three example setpoint adjustment functions. As with FIGS. 3 and 4, the top panel of the figure depicts an incoming frame transmission 502-1 that is unsuccessfully decoded by the time the transmission completes at the nominal termination target. The next incoming frame transmission 502-2 then begins to be received, and at the same time the extended decoding interval 504 begins; by way of example, the extended decoding interval is shown as lasting until the virtual termination target.

Panel (a) illustrates a setpoint adjustment function that increases linearly from the nominal setpoint value 506 at the nominal termination target to an increased value 508 at the virtual termination target. The increased value is greater than the nominal value by the setpoint jump. The setpoint adjustment function 507 is depicted a dotted line. In this example, the extended decoding interval is subdivided into four successive intermediate decoding intervals. The intermediate setpoint steps 507-1, 507-2, 507-3, and 507-4 for the four intervals are then determined according to the setpoint adjustment function 507.

Panel (b) illustrates a setpoint adjustment function that increases linearly from the nominal setpoint value 510 at the nominal termination target to an increased value below that of setpoint 512 at the virtual termination target, and the jumps discontinuously to setpoint 512. Again, the setpoint adjustment function 511 is depicted a dotted line, and the extended decoding interval is subdivided into four successive intermediate decoding intervals. The intermediate setpoint steps 511-1, 511-2, 511-3, and 511-4 for the four intervals are then determined according to the setpoint adjustment function 511. In this case, the first three intermediate setpoints steps increase more slowly than the setpoint adjustment function 507 in panel (a).

Panel (c) illustrates a setpoint adjustment function that increases in a nonlinear fashion from the nominal setpoint value 514 at the nominal termination target to an increased value 516 at the virtual termination target. Once more, the setpoint adjustment function 515 is depicted a dotted line, and the extended decoding interval is subdivided into four successive intermediate decoding intervals. The intermediate setpoint steps 515-1, 515-2, 515-3, and 515-4 for the four intervals are then determined according to the setpoint adjustment function 515.

In keeping with the terminology introduced in connection with the discussion of FIG. 1, the value of the setpoint after any given intermediate setpoint step has been applied corresponds to the "increased value," and the value of the setpoint after the setpoint jump has been applied corresponds to the "maximum increased value." Additionally, the sum of all intermediate setpoint steps for a given setpoint adjustment function is the setpoint jump. The size of each intermediate step depends on the setpoint jump, the number of intermediate decoding intervals between the nominal termination target and the virtual termination target, and the setpoint adjustment function as defined over the extended decoding interval (from the nominal termination target to the virtual termination target). It should be understood that the example setpoint adjustment functions shown in FIG. 5 are illustrative, and should not be viewed as limiting with respect to the present invention or embodiments thereof.

4. Implementation of Example Embodiments

The example embodiment of dynamic setpoint adjustment during extended frame decoding described above can be implemented as a method in a base station that is part of a wireless communication system that operates according to a CDMA family of protocols, such as the one described above in connection with FIG. 2. The next subsection provides logical steps and operations of the method of example embodiment of dynamic setpoint adjustment during extended frame decoding. Example means for carrying out the method in a base station are described in the subsequent subsection.

a. Example Method

Figure 6:
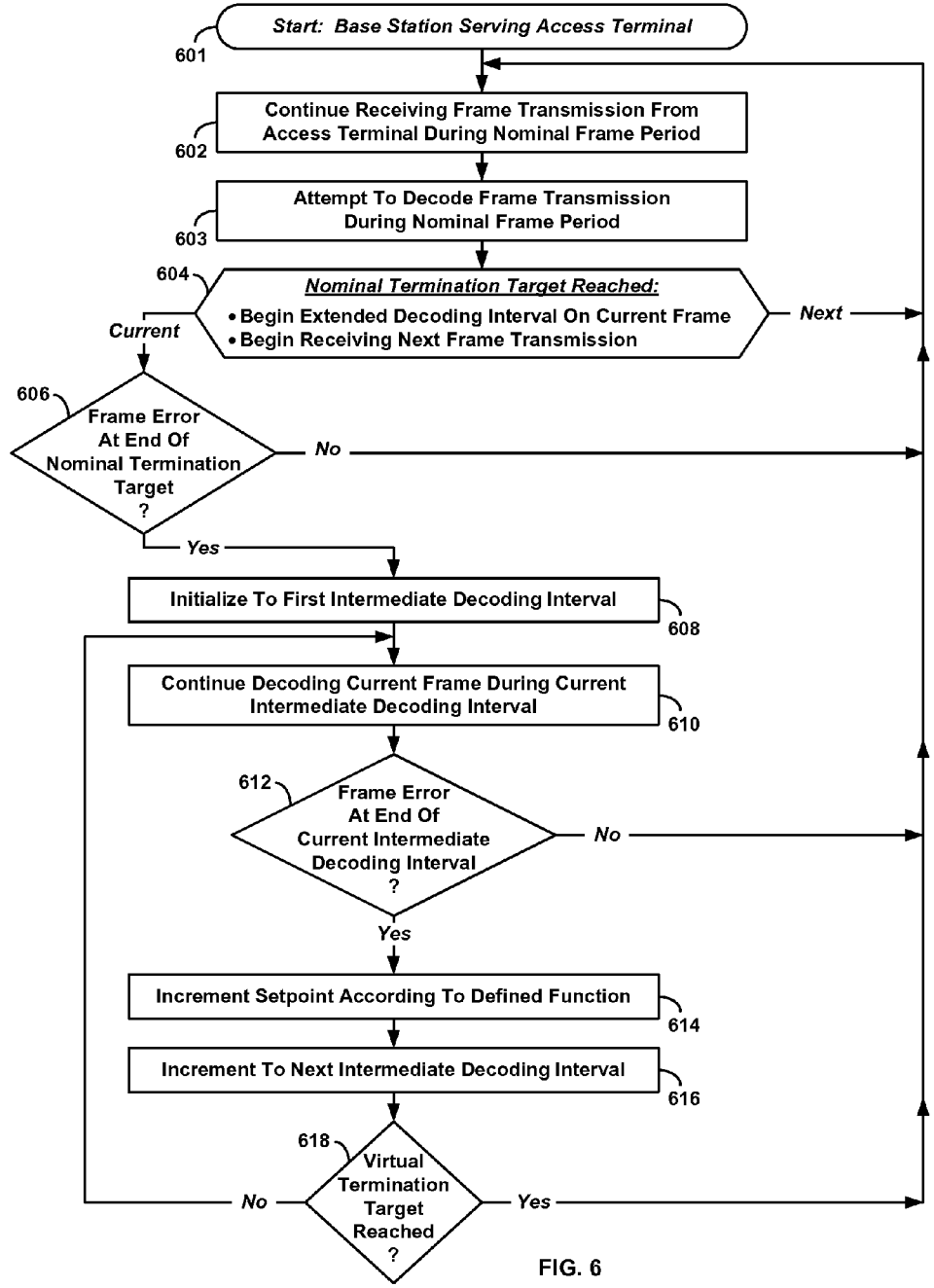
FIG. 6 illustrates an example of logical process steps for implementing an embodiment of dynamic setpoint adjustment during extended frame decoding.

FIG. 6 depicts an example method carried out by a base station of the example embodiment of dynamic setpoint adjustment during extended frame decoding in the form of a logical flowchart. The steps could be implemented as software, firmware, and/or hardware instructions stored in physical memory of a suitable sending entity, and executed by one or more general purpose and/or special purpose processors.

At the start 601 the base station is serving an access terminal in an active voice or data session. In particular, the base station will be receiving frame transmissions from the access terminal on the reverse link. This is indicated at step 602 where the base station continues to receive a frame transmission from the access terminal during a current nominal frame period.

At step 603, the base station attempts to decode the frame transmission during the current nominal frame period. Note that the separation between steps 602 and 603 of receiving the frame transmission and decoding it is made for the purpose of discussion. In practice, the two operations may be carried out concurrently, which could be indicated by combining steps 603 and 603.

Step 604 marks the point in time at which the nominal termination target for the current nominal frame period is reached. At this point, the base station begins receiving the next incoming frame transmission from the access terminal in the next nominal frame period. This is indicated by the arrow from step 604 labeled "Next" that returns to step 602. Concurrently with the start of the next incoming frame, the base station also begins an extended decoding interval for the current frame—i.e., the incoming frame transmission that just completed at the nominal termination target. This is indicated by the arrow from step 604 labeled "Current" that points to step 606. For purposes of the present discussion, the term "current frame" shall refer to the just-finished frame transmission, which corresponds to the nominal frame period that ended at step 604 as the next one began.

At step 606, the base station determines if a frame error occurred. That is, the base station determines whether or not the current frame transmission was successfully decoded into a frame by the time of the nominal termination target. If no frame error occurred ("No" branch from step 606), then the process returns to step 602, where the next frame transmission continues to be received. Note that this corresponds a successful nominal frame period, so that no extended decoding interval needs to be carried out. In this case, the extended decoding interval referenced in step 604 never actually happens, except to determine that extended decoding is not needed.

If a frame error has occurred ("Yes" branch from step 606), then the process moves to step 608, wherein the first intermediate decoding interval is started. In this case, the preceding nominal frame period was unsuccessful, so an extended decoding interval is carried out for the current frame. Step 608 also sets the "current" intermediate decoding interval to the "first" intermediate decoding interval; this identifies which one of the total number of intermediate decoding intervals is currently being carried out.

At step 610, the decoding continues for the current frame during the current intermediate decoding interval, and at step 612, the base station determines if there is a frame error at the end of the current intermediate decoding interval; i.e.— whether or not a frame has been successfully decoded during the current intermediate decoding interval. If the current intermediate decoding interval has been successful and there is no frame error ("No" branch from step 612), then the process returns to step 602, where the next frame transmission continues to be received.

If a frame error has occurred ("Yes" branch from step 612), then the process moves to step 614, wherein the setpoint is incremented according to the setpoint adjustment function. For example, one of the functions illustrated in FIG. 5 could be used. It will be appreciated that other forms of the setpoint adjustment function are possible as well.

At step 616, the "current" intermediate decoding interval is incremented to the "next" intermediate decoding interval. In this case, the just-finished intermediate decoding interval was unsuccessful, so extended decoding continues.

Next, a determination is made at step 618 as to whether the virtual termination target has been reach. For example, if there is a maximum of N intermediate decoding intervals and the increment made at step 616 yields N+1, then the virtual termination target has been reached, and there are no more intermediate decoding intervals remaining. If the virtual termination target has been reached ("Yes" branch from step 618), then the process returns to step 602, where the next frame transmission continues to be received.

If the virtual termination target has not been reached ("No" branch from step 618), then the process returns to step 610, wherein the decoding continues for the current frame during the current intermediate decoding interval.

It will be appreciated that the steps shown in FIG. 6 are meant to illustrate operation of an example embodiment of dynamic setpoint adjustment during extended frame decoding. As such, various steps could be altered or modified, and the ordering of certain steps could be changed, while still achieving the overall desired operation.

b. Example Base Station

Figure 7:
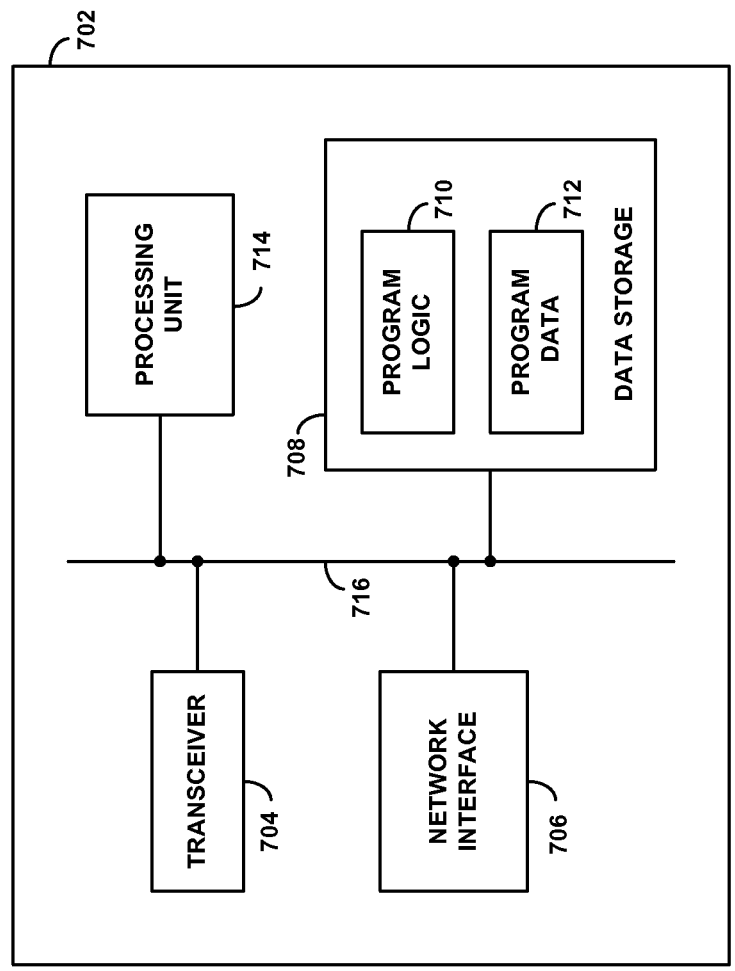
FIG. 7 is a block diagram of an example base station in which dynamic setpoint adjustment during extended frame decoding could be implemented.

FIG. 7 is a simplified block diagram depicting functional components of an example base station (or BTS) 702 in which dynamic setpoint adjustment during extended frame decoding may be implemented according, for example, to the example method described above. As shown in FIG. 7, the example base station 702, representative of BTS 204 or BSC 206 integrated with BTS 204 FIG. 2, for instance, includes a transceiver 704, network interface 706, a processing unit 714, and data storage 708, all of which may be coupled together by a system bus 716 or other mechanism. In addition, the base station may also include external storage, such as magnetic or optical disk storage, although this is not shown in FIG. 7.

These components may be arranged to support conventional operation in a wireless communication network that is compliant with a CDMA family of protocols, such as network 200 illustrated in FIG. 2. The details of such an arrangement and how these components function to provide conventional operation are well-known in the art, and are not described further herein. Certain aspects of base station 702 relevant to intelligent power control are discussed briefly below.

Network interface 706 enables communication on a network, such network 200. As such, network interface 706 may take the form of trunk or optical link that can be coupled with a TDM switch such as MSC 208, or an Ethernet network interface card or other physical connection that can be coupled with PCF 214, for instance. Further, network interface 706 in combination with transceiver 704, which may include one or more BTS antennas, enables air interface communication one or more access terminals, supporting reception of power-control commands on the ATs' reverse links and transmission of power control commands on the ATs' forward links.

Processing unit 714 comprises one or more general-purpose processors (e.g., INTEL microprocessors) and/or one or more special-purpose processors (e.g., dedicated digital signal processor, application specific integrated circuit, etc.). In turn, the data storage 708 comprises one or more volatile and/or non-volatile storage components, such as magnetic or optical memory or disk storage. Data storage 708 can be integrated in whole or in part with processing unit 714, as cache memory or registers for instance. As further shown, data storage 708 is equipped to hold program logic 710 and program data 712.

Program logic 710 may comprise machine language instructions that define routines executable by processing unit 714 to carry out various functions described herein. In particular the program logic, communication interface, and transceiver may operate cooperatively to carry out logical operation such as that discussed above and illustrated in FIG. 6. Further, program data 712 may be arranged to store one or more setpoint adjustment functions and other data in conjunction with the logical operations described above.

It will be appreciated that there can be numerous specific implementations of dynamic setpoint adjustment during extended frame decoding in base station, such AT 702 illustrated in FIG. 7. Further, one of skill in the art would understand how to devise and build such an implementation. As such, AT 702 is representative of means for carrying out the methods of dynamic setpoint adjustment during extended frame decoding in accordance with the functions and steps described herein by way of example.

5. Conclusion

An exemplary embodiment of the present invention has been described above. Those skilled in the art will understand, however, that changes and modifications may be made to this embodiment without departing from the true scope and spirit of the invention, which is defined by the claims.

We claim:

1. In a base station having an air interface, a method comprising:
   during a nominal time interval equal to one frame, receiving a transmission on the air interface from an access terminal being served by the base station;
   upon completion of the nominal time interval, making a determination that the transmission has not been successfully decoded into a frame of data; and
   in response to making the determination, for each of successive additional time intervals during which a continued attempt to decode the transmission remains unsuccessful, incrementing a target power level for received transmissions from the access terminal,
   wherein the successive additional time intervals comprise a maximum number of successive additional time intervals for continued attempts to decode the transmission,
   wherein the target power level has a nominal value at completion of the nominal time interval and a maximum increased value at completion of the maximum number of successive additional time intervals,
   wherein a change from the nominal value at completion of the nominal time interval to the maximum increased value at completion of the maximum number of successive additional time intervals defines a power increment function as a function time,
   and wherein incrementing the target power level comprises increasing the target power level according to the power increment function.

2. The method of claim 1, wherein incrementing the target power level further comprises incrementing the target power level upon completion of each successive additional time interval for which the continued attempt to decode the transmission was unsuccessful.

3. The method of claim 2, further comprising incrementing the target power level upon completion of the nominal time interval.

4. The method of claim 1,
wherein incrementing the target power level further comprises ceasing increasing the target power level upon a first occurrence of at least one of (i) successful decoding of the transmission during one of the successive additional time intervals, or (ii) completion of the maximum number of successive additional time intervals.

5. The method of claim 4, wherein the target power level has the nominal value during the nominal time interval,
wherein the target power level has an increased value after the first occurrence of the at least one of (i) successful decoding of the transmission during one of the successive additional time intervals, or (ii) completion of the maximum number of successive additional time intervals,
and wherein ceasing increasing the target power level comprises one of keeping the target power level at the increased value, or reverting the target power level to the nominal value.

6. The method of claim 1, wherein the power increment function is a linear function of (i) a difference between the maximum increased value and the nominal value and (ii) a time interval from completion of the nominal time interval to completion of the maximum number of successive additional time intervals.

7. The method of claim 1, wherein the base station and the access terminal both operate according to a CDMA family of protocols, including 1X-RTT,
wherein the end of the nominal time interval corresponds to a nominal termination target, and the end of the maximum number of successive additional time intervals following the nominal termination target corresponds to a virtual termination target,
and wherein the target power level corresponds to a setpoint of an outer-loop power control protocol used by the base station to determine power-control commands sent to the access terminal.

8. A base station comprising:
means for receiving a transmission on an air interface from an access terminal being served by the base station during a nominal time interval equal to one frame;
means for making a determination that the transmission has not been successfully decoded into a frame of data upon completion of the nominal time interval; and
means for incrementing a target power level for received transmissions from the access terminal for each of successive additional time intervals during which a continued attempt to decode the transmission remains unsuccessful,
wherein the successive additional time intervals comprise a maximum number of successive additional time intervals for continued attempts to decode the transmission,
wherein the target power level has a nominal value at completion of the nominal time interval and a maximum increased value at completion of the maximum number of successive additional time intervals,
wherein a change from the nominal value at completion of the nominal time interval to the maximum increased value at completion of the maximum number of successive additional time intervals defines a power increment function as a function time,
and wherein incrementing the target power level comprises increasing the target power level according to the power increment function.

9. The base station of claim 8, wherein incrementing the target power level further comprises incrementing the target power level upon completion of each successive additional time interval for which the continued attempt to decode the transmission was unsuccessful.

10. The base station of claim 9, further comprising means for incrementing the target power level upon completion of the nominal time interval.

11. The base station of claim 8,
wherein incrementing the target power level further comprises ceasing increasing the target power level upon a first occurrence of at least one of (i) successful decoding of the transmission during one of the successive additional time intervals, or (ii) completion of the maximum number of successive additional time intervals.

12. The base station of claim 11, wherein the target power level has the nominal value during the nominal time interval,
wherein the target power level has an increased value after the first occurrence of the at least one of (i) successful decoding of the transmission during one of the successive additional time intervals, or (ii) completion of the maximum number of successive additional time intervals,
and wherein ceasing increasing the target power level comprises one of keeping the target power level at the increased value, or reverting the target power level to the nominal value.

13. The base station of claim 8, wherein the power increment function is a linear function of (i) a difference between the maximum increased value and the nominal value and (ii) a time interval from completion of the nominal time interval to completion of the maximum number of successive additional time intervals.

14. The base station of claim 8, wherein the base station is configured to operate according to a CDMA family of protocols, including 1X-RTT,
wherein the end of the nominal time interval corresponds to a nominal termination target, and the end of the maximum number of successive additional time intervals following the nominal termination target corresponds to a virtual termination target,
and wherein the target power level corresponds to a setpoint of an outer-loop power control protocol used by the base station to determine power-control commands sent to the access terminal.

15. A tangible computer-readable medium having stored thereon computer-executable instructions that, if executed a processor of a base station, cause the base station to perform functions comprising:
during a nominal time interval equal to one frame, receiving a transmission on an air interface from an access terminal being served by the base station;
upon completion of the nominal time interval, making a determination that the transmission has not been successfully decoded into a frame of data; and
in response to making the determination, for each of successive additional time intervals during which a continued attempt to decode the transmission remains unsuccessful, incrementing a target power level for received transmissions from the access terminal,
wherein the successive additional time intervals comprise a maximum number of successive additional time intervals for continued attempts to decode the transmission,
wherein the target power level has a nominal value at completion of the nominal time interval and a maximum increased value at completion of the maximum number of successive additional time intervals,
wherein a change from the nominal value at completion of the nominal time interval to the maximum increased value at completion of the maximum number of successive additional time intervals defines a power increment function as a function time, and wherein incrementing the target power level comprises increasing the target power level according to the power increment function.

16. The tangible computer-readable of claim 15, wherein incrementing the target power level further comprises incrementing the target power level upon completion of each successive additional time interval for which the continued attempt to decode the transmission was unsuccessful.

17. The tangible computer-readable of claim 16, wherein execution of computer-executable instructions by the processor further cause the base station to perform the function of incrementing the target power level upon completion of the nominal time interval.

18. The tangible computer-readable of claim 15,
wherein incrementing the target power level further comprises ceasing increasing the target power level upon a first occurrence of at least one of (i) successful decoding of the transmission during one of the successive additional time intervals, or (ii) completion of the maximum number of successive additional time intervals.

19. The tangible computer-readable of claim 18, wherein the target power level has the nominal value during the nominal time interval,
wherein the target power level has an increased value after the first occurrence of the at least one of (i) successful decoding of the transmission during one of the successive additional time intervals, or (ii) completion of the maximum number of successive additional time intervals,
and wherein ceasing increasing the target power level comprises one of keeping the target power level at the increased value, or reverting the target power level to the nominal value.

20. The tangible computer-readable of claim 15, wherein the power increment function is a linear function of (i) a difference between the maximum increased value and the nominal value and (ii) a time interval from completion of the nominal time interval to completion of the maximum number of successive additional time intervals.

21. The tangible computer-readable of claim 15, wherein the base station is configured to operate according to a CDMA family of protocols, including 1X-RTT,
wherein the end of the nominal time interval corresponds to a nominal termination target, and the end of the maximum number of successive additional time intervals following the nominal termination target corresponds to a virtual termination target,
and wherein the target power level corresponds to a setpoint of an outer-loop power control protocol used by the base station to determine power-control commands sent to the access terminal.

* * * * *